Patented May 28, 1940

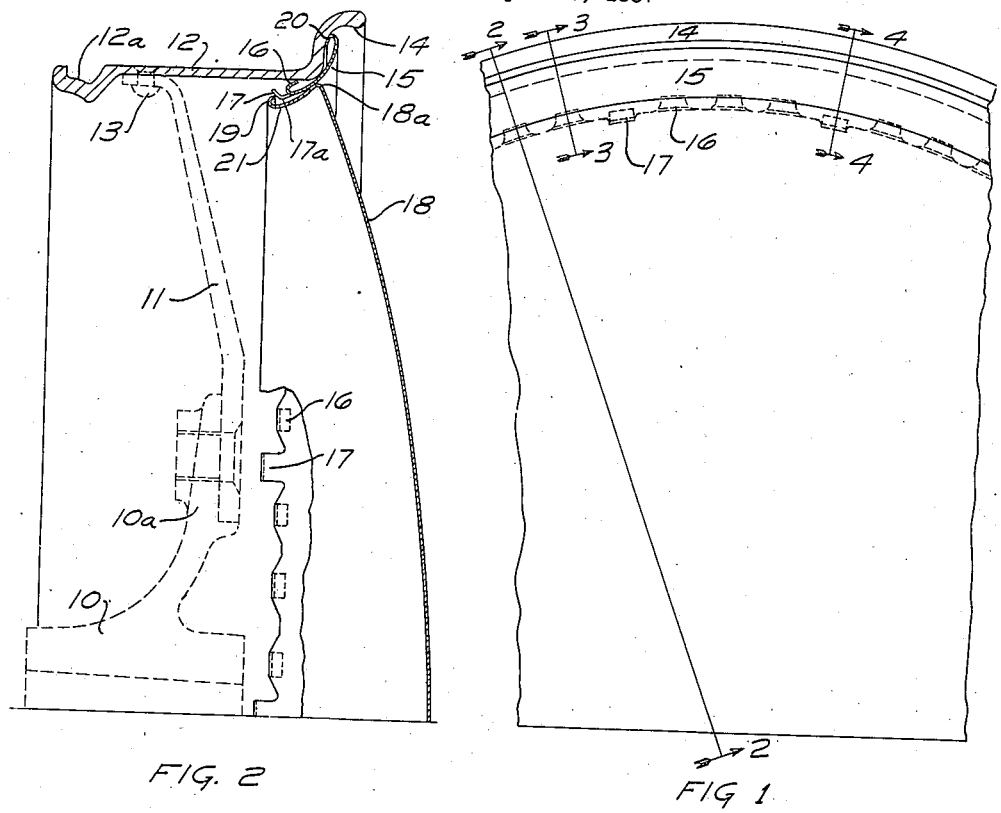
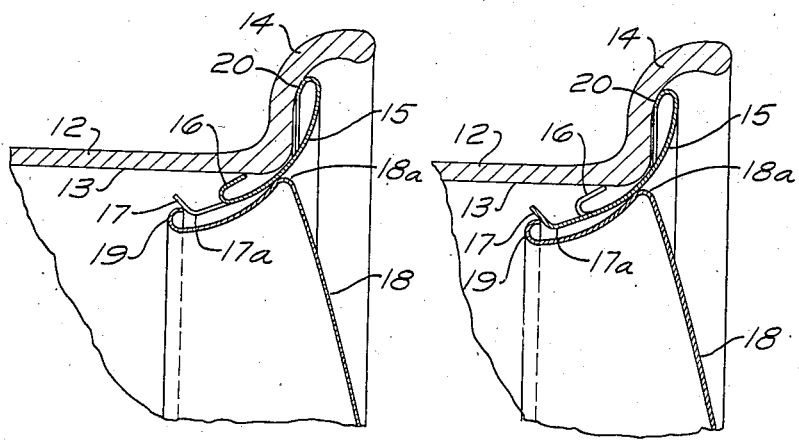

2,202,102

UNITED STATES PATENT OFFICE 2,202,102

VEHICLE WHEEL

Harry J. Horn, Lansing, Mich., assignor to Motor Wheel Corporation, Lansing, Mich., a corporation of Michigan Application September 18, 1937, Serial No. 164,447

9 Claims. (Cl. 301—37)

This invention relates to vehicle wheels and more particularly to trim rings and cover plates therefor.

It is an object of my invention to provide a novel trim ring and cover plate that can be attached to the rim of a vehicle wheel without the necessity of providing clips or other attaching means thereon.

Another object of the invention is to provide a trim ring that is frictionally held to the inner face of the rim of the vehicle wheel and is provided with a plurality of fingers for snap engagement with the wheel cover plate.

These and other objects ancillary thereto will become more apparent in the following specification when read in the light of the attached drawing.

In the drawing:

Figure 1 is a fragmentary vertical elevation of a wheel embodying the invention;

Figure 2 is a fragmentary sectional view taken on substantially the line 2—2 of Figure 1;

Figure 3 is a fragmentary sectional view taken on substantially the line 3—3 of Figure 1; and Figure 4 is a fragmentary sectional view taken on substantially the line 4—4 of Figure 1.

The construction herein disclosed comprises a hub 10 having a radial flange 10a to which a wheel body 11 is demountably secured by any suitable means (not shown). Rigidly attached to the outer periphery of the wheel body portion 11 by means of rivets 13 is a rim having a main body portion 12. At the outer edge of the main body portion 12 is a substantially radially extending flange 14, and at the inner edge of said main body portion 12 is a groove 12a for the reception of a loose side ring (not shown).

A trim ring 15 which is of generally channel shaped cross-section is secured to the rim at the corner formed by the junction of the flange 14 and the main body portion 12. The outer edge of the trim ring 15 is reversely bent to form a bead 20 which engages the outer face of the flange 14.

The inner edge of the ring 15 is also reversely bent and is notched at intervals to form a plurality of radially and axially extending projections. Some of these projections are bent axially away from the trim ring 15 to form resilient fingers 17. The remaining projections form teeth 16. Preferably every fourth projection is bent to form a finger 17, although, as will appear from the following description, the relative number of teeth 16 and fingers 17 may be varied as desired.

The teeth 16 are adapted to engage the inner surface of the main body portion 12 of the rim. Normally the distance between the outer ends of diagonally opposite teeth is slightly greater than the internal diameter of the main body portion 12 of the rim. Consequently, when the ring is pushed axially into the rim the teeth 16 are flexed radially inwardly and their resistance to flexing forces them against the inner face of the main body portion 12 of the rim. Any tendency of the trim ring 15 to come off the rim is resisted by the tendency of the radially outer ends of the teeth 16 to dig into the metal of the rim, thus preventing accidental separation of the rim and trim ring. The ring 15 can be removed, however, by inserting a screw driver or like tool between the bead 20 and flange 14 and exerting leverage on the bead 20. It is not intended, however, that the ring be removed, as once the trim ring is placed on the rim it is intended to be a permanent installation.

As stated hereinbefore, the fingers 17 are bent axially away from the main body of the trim ring 15, and the ends are formed to provide humps 17a which are adapted to engage a cooperating portion of a cover plate. The fingers 17 are flexible in a radial direction.

A wheel cover plate 18 is provided for concealing the central portion of the wheel. The cover plate has an annular flange 21 which extends both radially and axially inward from its outer edge, forming a shoulder 18a at its junction with the outer face of the cover plate. The shoulder 18a is of greater diameter than the inner diameter of the trim ring 15. At its inner edge the flange 21 is reversely bent outwardly to provide a bead 19 of slightly greater diameter than the distance between the humps 17a on diagonally opposite fingers 17. When the cover is placed on the wheel by pressing it axially inward, the bead 19 flexes the fingers 17 radially outwardly until the bead 19 passes over the hump 17a, whereupon the fingers return to their normal position and hold the cover 18 in place. The shoulder 18a engages the outer face of the trim ring 15 and prevents the cover from slipping past the trim ring in an axially inward direction.

The cover plate may be removed from the wheel by inserting a screw driver or similar instrument between the outer face of the trim ring 15 and the shoulder 18a and prying the cover off. During this operation the bead 19 flexes the fingers 17 radially outwardly until the bead 19 passes the humps 17a, thus freeing the cover plate from the trim ring. The fingers 17 then return to their normal position.

One advantage of the construction herein disclosed is that it may be attached to any type of rim of a given internal diameter. It is well known that tires are manufactured in a variety of standard sizes, and all rims must conform to the size of the tire for which they are intended. Consequently, there are but a few sizes of rims now in general use and the trim ring and cover plate disclosed herein may be made up in a relatively small number of sizes to fit the various sizes of rims. It is adapted for attachment by the manufacturer or may be applied later by the owner of the vehicle.

Another advantage of the construction is that no parts need be attached to the wheel to hold the trim ring in place and the entire structure is readily removable if desired.

The scope of the invention is indicated by the appended claims.

1. A vehicle wheel including, in combination, a trim ring having a circular toothed portion and a plurality of resilient fingers, said trim ring being secured to said wheel by frictional engagement of said toothed portion therewith, and a cover secured to said trim ring by a snap engagement with the said fingers.

2. A vehicle wheel including, in combination, a rim having an axially extending annular inner face portion, a trim ring having a toothed circular portion engaging the inner face of the rim, and a plurality of resilient fingers, the diameter of the toothed portion of the ring being normally greater than the diameter of the inner face of the rim, and a cover secured to said fingers.

3. A vehicle wheel including, in combination, a rim having an axially extending annular inner face portion and a radially extending flange, a trim ring, the outer edge of the trim ring engaging said flange, the inner edge of the trim ring engaging the inner face of the ring and being frictionally held thereto, a plurality of resilient fingers extending from said trim ring, and a cover yieldably engaged by said fingers.

4. A vehicle wheel including, in combination, a rim having an axially extending annular portion and a laterally extending annular flange, a trim ring, the outer edge of said trim ring engaging said flange, a plurality of spaced teeth extending from the inner edge of said ring and frictionally engaging the annular portion of said ring, and a wheel cover secured to said ring by snap engagement therewith.

5. A vehicle wheel including, in combination, a rim having an annular inner face portion, a ring comprising a body portion having a plurality of spaced teeth on one edge, said teeth extending radially and axially relative to said ring for engagement with the inner face portion of the rim, a plurality of resilient fingers extending substantially axially from said edge of the ring, and a cover for the outer face of the wheel, said cover being provided with a substantially axially extending annular flange of greater diameter at its free edge than the distance between diagonally opposite resilient fingers, said flange engaging said fingers and being held thereon by the resiliency thereof.

6. A vehicle wheel including, in combination, a rim having an annular inner face portion, a ring having a plurality of spaced projections thereon, certain of said projections frictionally engaging said annular inner face portion of the rim, and a cover yieldably engaged by the others of said projections.

7. The combination with a vehicle wheel of cover securing means including resilient fingers, certain of said fingers frictionally engaging the wheel to hold the cover securing means thereto, and a cover demountably secured to others of said fingers.

8. The combination with a vehicle wheel of a cover securing member having resilient fingers thereon directly engaging a load bearing part of the wheel to hold the cover securing means thereto solely by frictional engagement therewith, and a cover demountably attached to said cover securing means.

9. The combination with a vehicle wheel of a cover securing member having a plurality of resilient fingers thereon, said cover securing means being attached directly to a load bearing part of the wheel solely by frictional engagement therewith, and a cover demountably attached to said cover securing means by resilient snap on engagement with certain of said fingers.

HARRY J. HORN.